(12) United States Patent
Kumagai

(10) Patent No.: US 9,608,464 B2
(45) Date of Patent: Mar. 28, 2017

(54) CONTROL DEVICE, ELECTRIC STORAGE SYSTEM, ELECTRONIC DEVICE, ELECTRIC VEHICLE, AND ELECTRIC POWER SYSTEM TO BOOT UP A POWER SOURCE

(75) Inventor: Eiji Kumagai, Fukushima (JP)

(73) Assignee: Sony Corporation, Tokyo (JP)

( * ) Notice: Subject to any disclaimer, the term of this patent is extended or adjusted under 35 U.S.C. 154(b) by 861 days.

(21) Appl. No.: 13/538,606

(22) Filed: Jun. 29, 2012

(65) Prior Publication Data

US 2013/0009466 A1 Jan. 10, 2013

(30) Foreign Application Priority Data

Jul. 8, 2011 (JP) ................................. 2011-151742

(51) Int. Cl.
*H01H 47/00* (2006.01)
*H02J 7/00* (2006.01)

(52) U.S. Cl.
CPC ..... *H02J 7/0063* (2013.01); *H02J 2007/0095* (2013.01)

(58) Field of Classification Search
CPC .......................... H02J 2007/0095; H02J 7/0063
See application file for complete search history.

(56) References Cited

U.S. PATENT DOCUMENTS

| | | | |
|---|---|---|---|
| 5,539,299 A * | 7/1996 | Fernandez | H02J 7/0031 320/134 |
| 5,672,952 A * | 9/1997 | Szepesi | 320/164 |
| 7,586,727 B2 * | 9/2009 | Yamashita | B60L 3/0046 307/131 |
| 7,884,575 B2 * | 2/2011 | Shin et al. | 320/132 |
| 2003/0042866 A1 * | 3/2003 | Minamiura et al. | 320/104 |
| 2006/0043928 A1 * | 3/2006 | Nakasho | H02J 7/047 320/112 |
| 2007/0108941 A1 * | 5/2007 | Sainomoto et al. | 320/112 |
| 2007/0170989 A1 * | 7/2007 | Pan | 330/257 |
| 2009/0160405 A1 * | 6/2009 | Takeda | H01M 10/0525 320/152 |
| 2010/0012970 A1 | 1/2010 | Fang et al. | |
| 2010/0117602 A1 * | 5/2010 | Matsui | H02J 7/0031 320/152 |
| 2010/0141213 A1 * | 6/2010 | Iida | B60L 1/00 320/134 |

FOREIGN PATENT DOCUMENTS

| | | |
|---|---|---|
| EP | 1571458 | 9/2005 |
| GB | 2467231 A * | 7/2010 |
| JP | 2002-078216 | 3/2002 |
| WO | WO 2010043343 A1 * | 4/2010 |

OTHER PUBLICATIONS

European Patent Office, Extended European Search Report issued in connection with European Patent Application No. 12004880.6, dated Jul. 28, 2014. (7 pages).

\* cited by examiner

*Primary Examiner* — Richard Tan
(74) *Attorney, Agent, or Firm* — Chip Law Group

(57) ABSTRACT

A battery system including a battery unit including a plurality of battery cells, and a control device including a power supply boot-up unit. The power supply boot-up unit is configured to receive a voltage from the plurality of battery cells, and supply a control signal in response to the voltage supplied by the plurality of battery cells.

19 Claims, 11 Drawing Sheets

CONTROL DEVICE, ELECTRIC STORAGE SYSTEM, ELECTRONIC DEVICE, ELECTRIC VEHICLE, AND ELECTRIC POWER SYSTEM TO BOOT UP A POWER SOURCE

CROSS REFERENCES TO RELATED APPLICATIONS

The present application claims priority to Japanese Priority Patent Application JP 2011-151742 filed in the Japan Patent Office on Jul. 8, 2011, the entire content of which is hereby incorporated by reference.

BACKGROUND

The present disclosure relates to a control device, an electric storage system, an electronic device, an electric vehicle, and an electric power system, which boot up a power source using the voltage of a secondary battery.

Uses for lithium-ion secondary batteries and so forth have been expanded in electric power storage apparatuses, automotive batteries, and domestic electric appliances combined with a reproducible energy system such as solar batteries, wind-power generation, or the like. In recent years, in order to generate large output, electric storage systems to which a singular or multiple electric storage modules (also referred to as assembled battery) are connected have been employed. The electric storage modules are formed by a singular or multiple battery blocks being housed in an exterior case. The battery blocks are formed by multiple unit batteries which are an example of electric storage elements being connected (also referred to as electric cells or cells, and simply referred to as batteries as appropriate in the following description).

With Japanese Unexamined Application Publication No. 2002-078216, a load boot-up apparatus has been described so as to boot up a power supply circuit using one battery in such an electric storage module.

SUMMARY

With the load boot-up apparatus according to Japanese Unexamined Application Publication No. 2002-078216, a line for supplying the voltage of one battery has to be separately provided. Further, there has been a problem in that a configuration for activating the power supply circuit is complicated by a relay switch being employed. Further, there has been a problem in that in the case that the voltage of a battery for booting up a power source is extremely low, the power supply circuit is not activated.

It has been found desirable to provide a control device which boots up a power source using the voltage of a battery in an electric storage system. It has also been found desirable to provide an electric storage system employing the control device.

In order to solve the above problem, in one embodiment, a battery system includes a battery unit including a plurality of battery cells, and a control device including a power supply boot-up unit. The power supply boot-up unit is configured to receive a voltage from the plurality of battery cells, and supply a control signal in response to the voltage supplied by the plurality of battery cells.

In another embodiment, a control device includes a power supply boot-up unit configured to receive a voltage from a battery unit including a plurality of battery cells, the voltage being received from the plurality of battery cells, and supply a control signal in response to the voltage supplied by the plurality of battery cells.

In another embodiment, a method of activating an electric storage system includes initiating a supply of a voltage from a battery unit including a plurality of battery cells to a power supply boot-up unit, the voltage being supplied by the plurality of battery cells.

In another embodiment, a method of deactivating an electronic storage system includes stopping a supply of a voltage from a battery unit including a plurality of battery cells to a power supply boot-up unit, the voltage being supplied by the plurality of battery cells.

In another embodiment, an electric vehicle includes a battery system including a battery unit including a plurality of battery cells, and a control device including a power supply boot-up unit configured to receive a voltage from the plurality of battery cells, and supply a control signal in response to the voltage supplied by the plurality of battery cells, and a converter configured to receive a supply of electric power from the battery system, and to supply the power to a component of the electric vehicle.

According to at least one embodiment, a power source can be activated by the voltage of a battery in an electric storage system.

Additional features and advantages are described herein, and will be apparent from the following Detailed Description and the figures.

DETAILED DESCRIPTION

Embodiments of the present disclosure will be described below with reference to the drawings. Note that description will be made in the following sequence.
1. First Embodiment
2. Second Embodiment
3. Modification
4. Application Note that the present disclosure is not restricted to the embodiments and so forth that will be described below.

1. First Embodiment

Overview of Electric Storage Module

In the case of employing a great number of electric storage elements, e.g., battery cells to generate large output, a configuration is employed as an example wherein multiple electric storage units (hereafter, referred to as electric storage modules) are connected thereto, and a control device is provided common to the multiple electric storage modules. Such a configuration will be referred to as an electric storage system.

Electric storage modules making up an electric storage system are units combined of a battery block and a module controller to be housed in an exterior case. The battery block is, for example, eight cylindrical lithium-ion secondary batteries being connected in parallel. For example, 16 battery blocks are serially connected within the exterior case of an electric storage module. Note that the number of battery blocks, and a connection mode may be changed as appropriate. Further, secondary batteries other than lithium-ion secondary batteries may be employed.

The electric storage modules have an exterior case. It is desirable to employ a material having high thermal conductivity and emissivity as a material of the exterior case. Excellent heat dissipation property in the exterior case can be obtained by employing a material having high thermal conductivity and emissivity. Temperature rise within the exterior case can be prevented by obtaining excellent heat dissipation property. Further, an opening portion of the exterior case can be minimized or eliminated, and accordingly, high dust-proofness and drip-proofness can be realized. As for the exterior case, a material, for example, such as aluminum, aluminum alloy, copper, copper alloy, or the like is employed.

Overview of Electric Storage System

Figure 1:
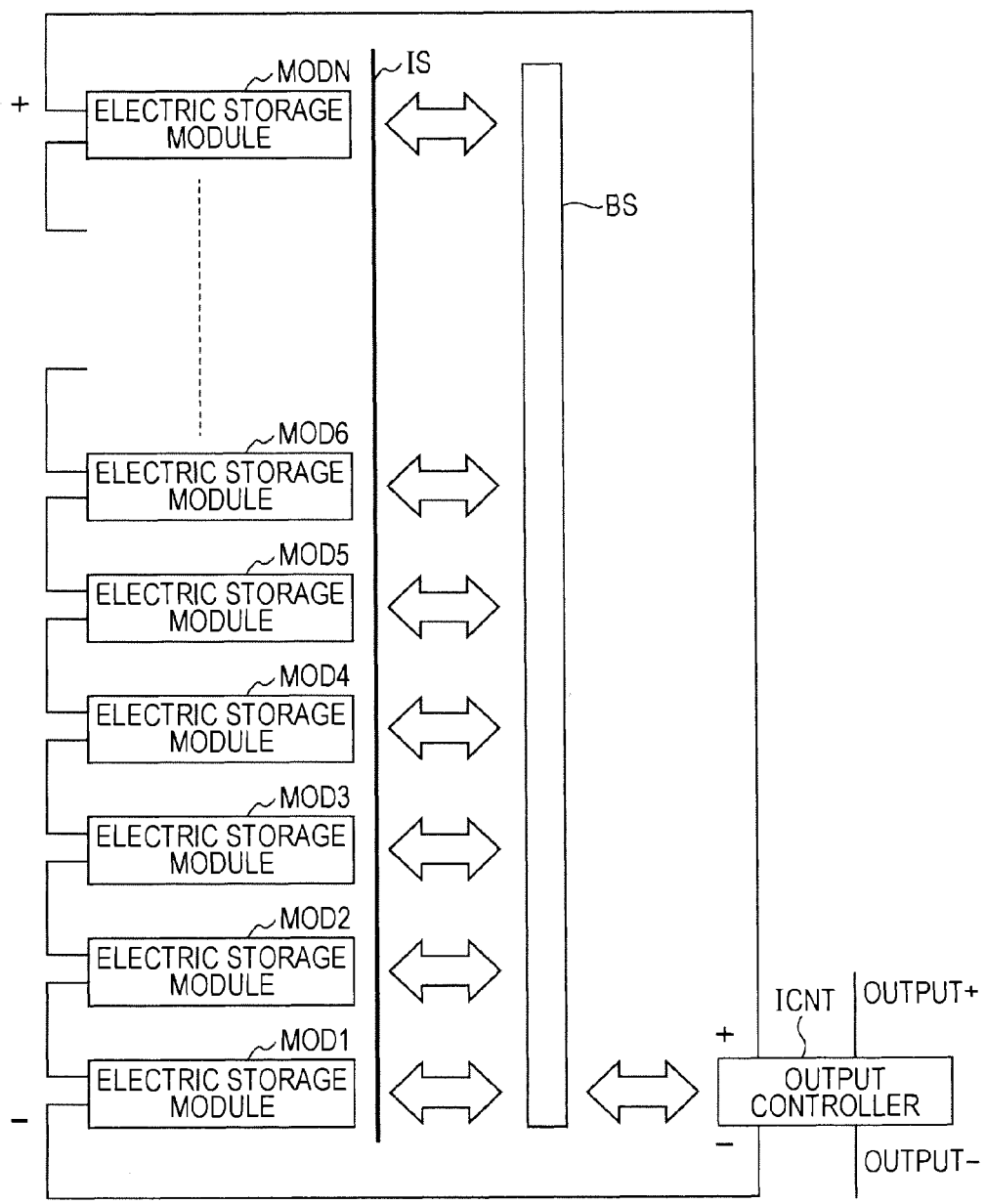
FIG. 1 is a block diagram illustrating an example of the configuration of an electric storage system.

Description will be made regarding the overview of an electric storage system configured of a singular or multiple electric storage modules being used. FIG. 1 illustrates an example of the electric storage system. With the electric storage system, N electric storage modules MOD1 through MODN are serially connected. The number of the electric storage modules to be connected and the connection mode thereof can be changed as appropriate. The electric storage modules MOD1 through MODN are connected to an interface bus BS via an insulating unit IS.

With the electric storage modules MOD, an insulation interface IF is provided to connect a module controller CNT with the external interface BS. The insulation interface IF takes charge of insulation between the electric storage module MOD and the interface bus BS. Further, the module controllers CNT are connected to the entire control device (hereafter, referred to as output controller as appropriate) ICNT, and the output controller ICNT performs management for charging management, discharging management, and deterioration control, and so forth.

A serial interface is employed as a bus within an electric storage module, and the bus BS which connects the electric storage modules MOD1 through MODN, and the output controller ICNT. Specifically, an SM bus (System Management Bus), or the like is employed as a serial interface. For example, an I2C bus can be employed. The I2C but is synchronous serial communication for performing communication using two signal lines of SCL (serial clock) and bidirectional SDA (serial data).

The controller CNT of each electric storage module MOD, and the output controller ICNT perform communication. Specifically, information of an internal state of each electric storage module MOD is received by the output controller ICNT, the charging processing and discharging processing of each electric storage module MOD are managed. The output controller ICNT supplies output of series connection of the N electric storage modules MOD to a load. The electric storage modules MOD can be connected one to another. In the case that the output voltage of one electric storage module MOD is, for example, 51.2 V, and N=1 through N=16, output voltage of (approximate 50 V through approximate 800 V) is generated from the output controller ICNT.

Figure 2:
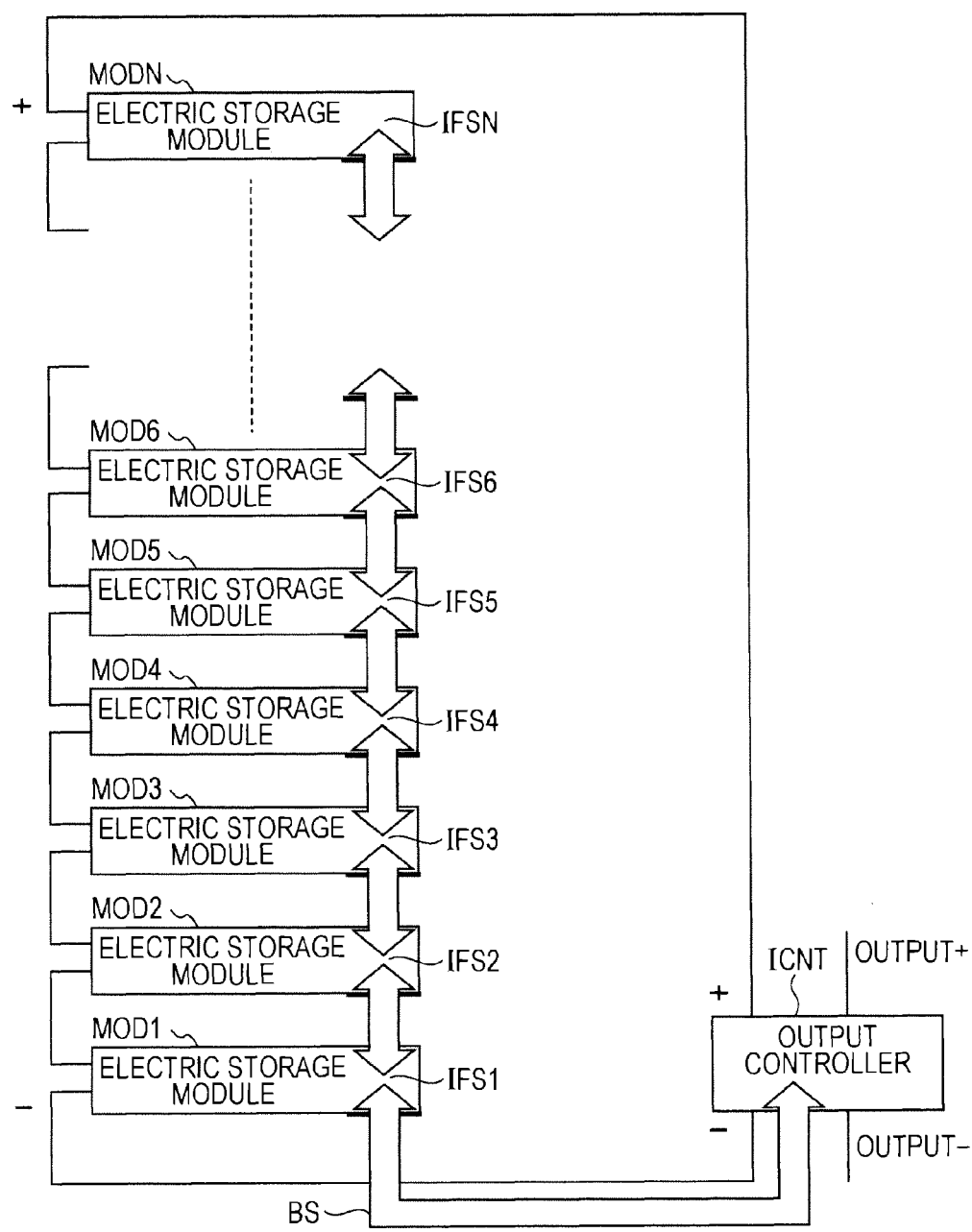
FIG. 2 is a block diagram illustrating another example of the configuration of the electric storage system.

FIG. 2 illustrates another example of the electric storage system. With the other example, N electric storage modules MOD1 through MODN are serially connected. Each of the electric storage modules MOD1 through MODN includes an insulation interface for insulating between the electric storage modules MOD. The module controller CNT of each electric storage module MOD performs communication with an upper level or lower level electric storage module MOD, or communication with the external output controller ICNT through photo couplers IFS1 through IFSN which are examples of an insulation interface.

The output controller ICNT is connected to the lowest level electric storage module MOD1. The output controller ICNT controls the entire electric storage system. The output controller ICNT receives information of the internal state of each electric storage module MOD, and supplies or blocks charging current and discharging current as to each electric storage module MOD, and accordingly, charging and discharging of each electric storage module MOD is controlled. A control signal from the output controller ICNT is, for example, transmitted to an upper level electric storage module MOD via a lower level electric storage module MOD.

Configuration of Electric Storage System

Figure 3:
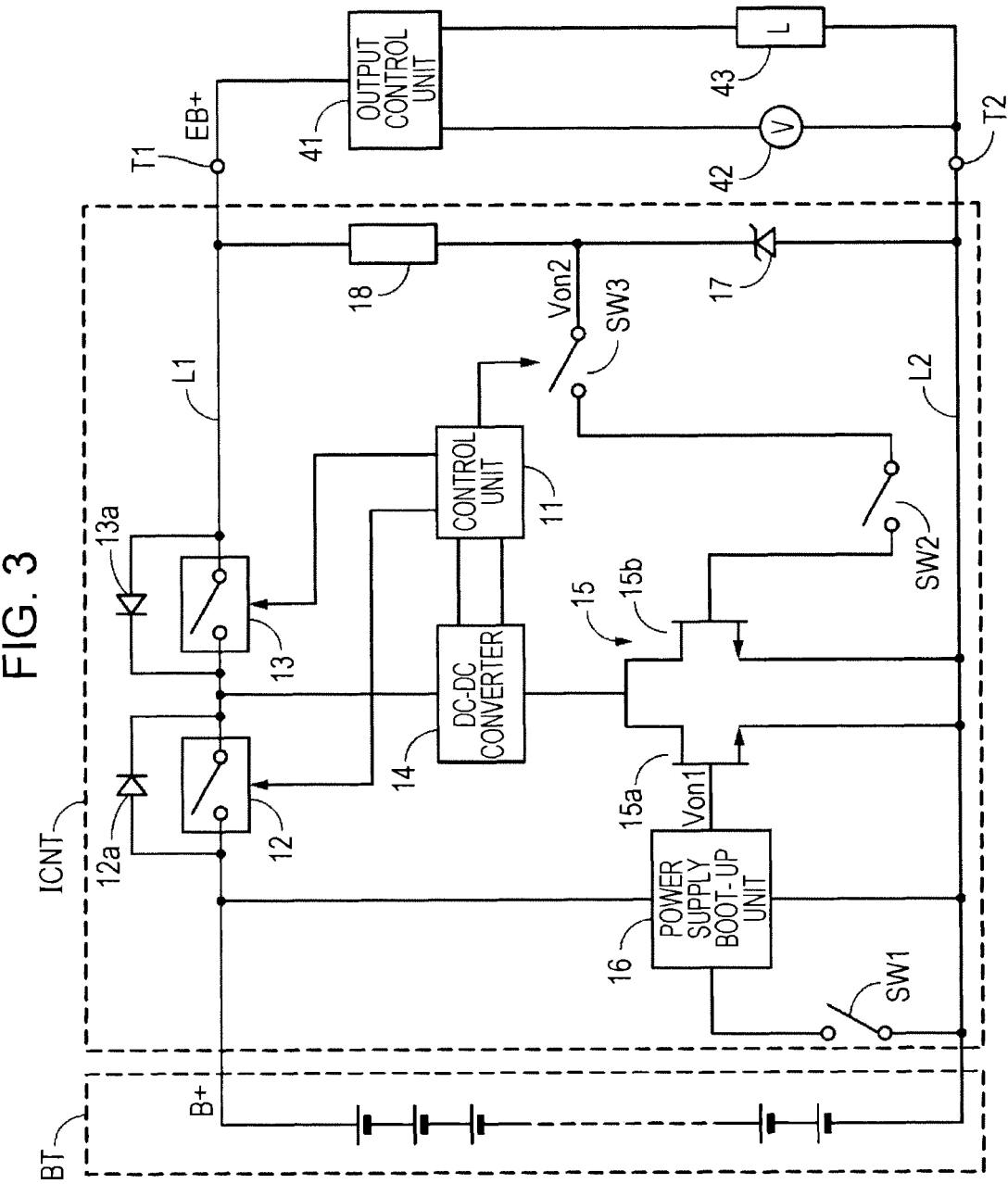
FIG. 3 is a block diagram illustrating an example of the specific configuration of the electric storage system.

An example of a specific configuration of the electric storage system will be described with reference to FIG. 3. In FIG. 3, with regard to a configuration for communication such as communication lines and so forth, drawing is omitted as appropriate. A battery unit BT in the electric storage system is configured of the above singular or multiple electric storage modules MOD being connected. The number of electric storage modules MOD to be connected is set according to the usage as appropriate. Note that, though drawing is omitted, a battery monitor for detecting the voltage of each battery to calculate SOC (State Of Charge) may be provided to the battery unit BT. Information such as the voltage value, SOC, and so forth of the battery detected by the battery monitor may be supplied a control unit 11 of the output controller ICNT.

The output controller ICNT which is an example of a control device is connected to the batter unit BT. The control unit 11 in the output controller ICNT is, for example, a microcomputer configured of a CPU (Central Processing Unit). Unshown ROM (Read Only Memory), RAM (Random Access Memory), and so forth are connected to the control unit 11. The control unit 11 uses the RAM as work memory to perform control in accordance with a program stored in the ROM. The control unit 11 uses information supplied from the battery monitor to perform various controls for managing the battery unit BT, for example.

A positive power supply line L1 is disposed between the positive pole side of the battery unit BT and a positive terminal T1, and a negative power supply line L2 is disposed between the negative pole side of the battery unit BT and a negative terminal T2. The output controller ICNT is connected to an external system via the terminals T1 and T2. At least one of a power source 42 and a load 43 is connected to the terminal T1 and terminal T2 via an output control unit 41. When the power source 42 is connected, the battery unit BT is charged by the power source 42. When the load 43 is connected, the electric power of the battery unit BT is supplied to the load 43. Note that a connection mode between the battery unit BT and the output controller ICNT, and a connection mode between the output controller ICNT and an external system may be wired or wireless.

The power source 42 is a DC power source formed by rectifying the AC power (commercial power source) of a power supply network, or a power generating apparatus (solar panel, wind power generating apparatus, or the like) taking advantage of reproducible energy. The load 43 is, for example, a domestic electronic appliance, and in general, the DC power of the electric storage system is converted into AD power and supplied to the electronic appliance. The load 43 can be set according to the usage of the electronic storage system as appropriate. The output control unit 41 controls whether to connect which of the power source 42 and load 43 to the terminals T1 and T2.

For example, in the case of employing a solar panel as the power source 42, the amount of generated power fluctuates depending on the weather, time zones, and so forth. Accordingly, in the daytime when the amount of generated power of the solar panel is great, the batty of the battery unit BT of the electric storage system is charged by the output of the solar panel, and also the output from the solar panel is supplied to the load 43. In the evening the solar panel does not generate electric power, and accordingly, electric power is supplied to the load 43 from the battery of the battery unit BT of the electric storage system. Such control is performed by the output control unit 41. However, this control is an example, and more complicated control is performed by taking the power consumption amount of the load 43 into consideration, or by combining uses of commercial power supply. In the case of employing such a power source 42, at the time of supplying charging power to the terminal T1 and terminal T2, the electric storage system in a shutdown state has to start charging.

One of the positive power supply line L1 and negative power supply line L2, e.g., a charging control switch 12 and a discharging control switch 13 are inserted into the positive power supply line L1. As for these switches, for example, an IGBT (Insulated Gate Bipolar Transistor) or MOSFET (Metal Oxide Semiconductor Field Effect Transistor) can be used. A diode 12a is connected in the forward direction as to discharging current in parallel with the charging control switch 12. A diode 13a is connected in the forward direction as to charging current in parallel with the discharging control switch 13.

Each of the charging control switch 12 and discharging control switch 13 is turned on or off by the control unit 11. Specifically, at the time of charging and discharging, the charging control switch 12 and discharging control switch 13 are turned on. At the time of discharging stop, the discharging control switch 13 is turned off. At this time, charging current is supplied to the battery of the battery unit BT through the diode 13a and charging control switch 12, and accordingly, charging is available. At the time of charging stop, the charging control switch 12 is turned off. At this time, discharging current is supplied to the load 43 through the diode 12a and discharging control switch 13. Note that the charging control switch 12 and discharging control switch 13 may be inserted into the negative power supply line L2.

Power supply voltage is supplied from a DC-DC converter 14 which is an example of a control power supply unit to the control unit 11. Input voltage is supplied from the power supply line L1 between the charging control switch 12 and the discharging control switch 13 to the DC-DC converter 14. Accordingly, not only the voltage from the battery unit BT but also the voltage from the power source connected to the terminals T1 and T2 are input to the DC-DC converter 14.

The DC-DC converter 14 generates power supply voltage for operating the control unit 11 from the voltage supplied to the DC-DC converter 14 in the operating state. The DC-DC converter 14 supplies the generated power supply voltage to the control unit 11. In the event that the DC-DC converter 14 is in the non-operating state, i.e., in a state in which the DC-DC converter is not operating, no power supply voltage is supplied to the control unit 11. The minus side of the DC-DC converter 14 is connected to the negative power supply line L2 via a control switch 15. Note that the control power unit is not restricted to a DC-DC converter, and may have another configuration such as a series regulator or the like.

The control switch 15 which is an example of an operation control unit is configured of, for example, two of switching elements 15a and 15b. The switching elements 15a and 15b are configured of an IGBT, for example. The switching elements 15a and 15b may be configured of a MOSFET. The switching elements 15a and 15b are each operated by voltage equal to or greater than a threshold being applied to each of the gates thereof. Though the threshold can be set as appropriate, the threshold is set to 6 V for example. The thresholds of the operation voltages of the switching elements 15a and 15b may be set to a different value.

The control switch 15 controls the operating state of the DC-DC converter 14. For example, in a first state of the control switch 15, the DC-DC converter 14 is shifted to the operating state, and in a second state of the control switch 15, the DC-DC converter 14 is shifted to the non-operating state. Here, the first state of the control switch 15 is, for example, a state in which at least one of the switching elements 15a and 15b is on. The second state is, for example, a state in which the switching elements 15a and 15b are both off. Note that the configuration of the control switch 15 can be changed as appropriate, and the first and second states can be set as appropriate according to the configuration of the control switch 15.

Voltage Von1 that is an example of a first control signal is supplied from the power-up unit 16 to the switching element 15a of the control switch 15. The power-up unit 16 is connected to the power supply line L1 between the positive pole side of the battery unit BT and the charging control switch 12, and the minus side is connected to the negative power supply line L2. That is to say, the voltage from the battery of the battery unit BT is supplied to the power-up unit 16. The power-up unit 16 generates a first control signal corresponding to the voltage of the battery unit BT, and supplies the generated first control signal to the switching element 15a.

The power-up unit 16 is further connected to the negative power supply line L2 via a switch SW1. The switch SW1 is turned on/off according to an operation for activating or stopping the electric storage system. For example, the switch SW1 is turned off when activating the electric storage system, and is turned on when stopping (shutting down) the electric storage system. According to on/off of the switch SW1, the voltage from the battery of the battery unit BT is supplied or stopped as to the power-up unit 16. For example, when the switch SW1 is off, the voltage from the battery of the battery unit BT is supplied to the power-up unit 16, and when the switch SW1 is on, supply of the voltage from the battery unit BT is stopped as to the power-up unit 16. Note that the detailed configuration of the power-up unit 16 will be described later.

Voltage Von2 that is an example of a second control signal is supplied to the switching element 15b of the control switch 15 via switches SW3 and SW2. The voltage Von2 is voltage formed from voltage between the terminals T1 and T2 by a zener diode 17, for example. The level of the voltage Von2 is equal to or greater than the threshold for turning on the switching element 15b, and is taken as 15 V as an example. The anode side of the zener diode 17 is connected to the negative power supply line L2. The cathode side of the zener diode 17 is connected to the positive power supply line L2 between the discharging control switch 13 and the terminal T1 via a resistor 18.

The switch SW2 is turned on/off according to an operation for activating or stopping the electric storage system, which is interlocked with on/off of the switch SW1. The switches SW1 and SW2 may independently be turned on/off. For example, the switch SW2 is turned on when activating the electric storage system, and is turned off when stopping (shutting down) the electric storage system. The switch SW2 is turned off, whereby the electric storage system can be stopped in a safe and sure manner.

The switch SW3 is a switch with on/off being controlled by the control unit 11. The switch SW3 is off in a state in which the electric storage system is in a shutdown state, for example. The switch SW3 is turned on by the control of the control unit 11 when the electric storage system is activated and the control unit 11 is operated.

Configuration of Power-Up Unit

Figure 4:
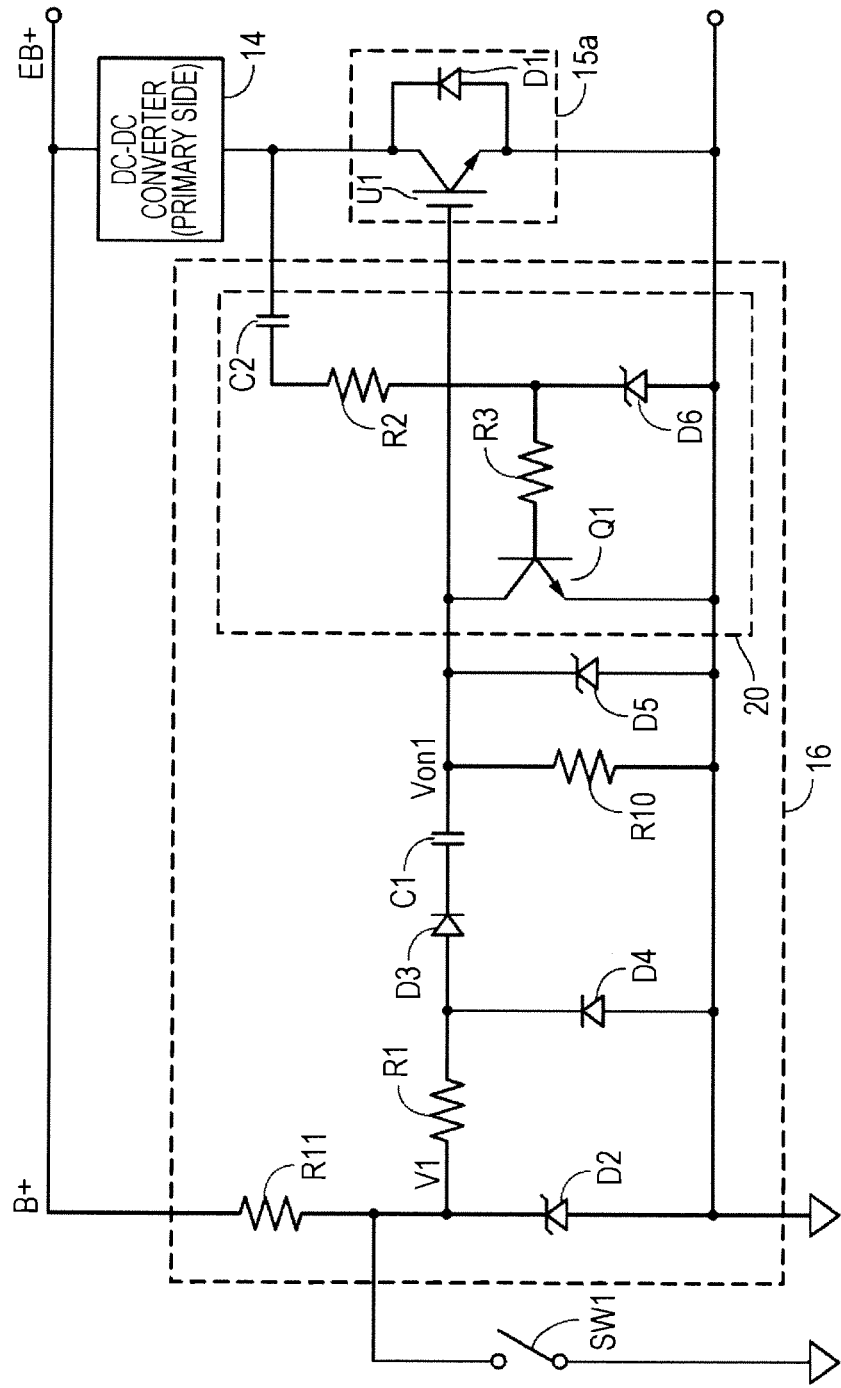
FIG. 4 is a circuit diagram for describing an example of the configuration of a power-up unit.

Next, an example of the configuration of the power-up unit 16 will be described with reference to FIG. 4. With the power-up unit 16, a series circuit of a resistor R11 and a zener diode D2 is inserted between the positive power supply line L1 and the negative power supply line L2 (ground), and voltage is supplied to the series circuit from the battery unit BT.

The switch SW1 is provided between a connection point between the resistor R11 and the cathode side of the zener diode D2, and the ground. When the switch SW1 is on, the zener diode D2 shorts, and accordingly, voltage V1 is not generated. In the event that the switch SW1 has been turned off, the voltage V1 is formed from the voltage of the battery unit BT by the resistor R11 and zener diode D2. The level of the voltage V1 that is an example of a predetermined signal is, for example, several tens V (Volts), and 30 V as an example.

The resistance value of the resistor R11 is set extremely high, and in the event that the voltage of the battery unit BT is 800 V or so, the resistance value of the resistor R11 is set to 10 MΩ (Mohm) for example. The resistance value of the resistor R11 is set high, whereby current to flow into the resistor R11 can be set to weak, and the power consumption of the battery unit BT can be reduced.

The voltage V1 generated at the connection point of the resistor R11 and zener diode D2 is supplied to an AC coupling capacitor C1 which is an example of a level tapering unit via a resistor R1 and a back-flow prevention zener diode D3. A diode D4 is connected to a connection point between the resistor R11 and the diode D3. With the AC coupling capacitor C1, the input side and output side of the AC coupling capacitor C1 are AC-coupled.

The level of the voltage V1 to be supplied to the AC coupling capacitor C1 is tapered by the AC coupling capacitor C1 being charged. The level of the voltage V1 is tapered by the AC coupling capacitor C1, and the voltage Von1 that is an example of the first control signal is formed by the tapered voltage V1. The voltage Von1 is a control signal for turning on the switching element 15a when the level of the voltage Von1 is equal to or grater than a threshold, and turning off the switching element 15a when the level of the voltage Von1 is smaller than the threshold. Potential difference is caused on both edges of the resistor R10 by the voltage Von1, and current flows into the resistor R10. The voltage Von1 to be output from the AC coupling capacitor C1 is supplied to the gate of the switching element 15a.

A zener diode D5 is connected to a connection point between the AC coupling capacitor C1 and the gate of the switching element 15a. According to the zener diode D5, the voltage Von1 is arranged so as not to exceed the zener voltage of the zener diode D5.

The switching element 15a is configured of, for example, a switching element U1 such as an IGBT or the like, and the diode D1 for protection. The collector side of the switching element 15a is connected to the primary side of the DC-DC converter 14. The above voltage Von1 is supplied to the gate of the switching element U1. When the voltage Von1 is equal to or greater than a threshold, the switching element U1 is turned on, and in the event that the voltage Von1 is smaller than the threshold, the switching element U1 is turned off. The threshold is set to 6 V, for example.

The voltage of the battery unit BT is supplied to the DC-DC converter 14 by the switching element U1 being turned on. Voltage is then generated on the primary side of the DC-DC converter 14, the generated voltage is supplied to the secondary side of the DC-DC converter 14, and the DC-DC converter 14 is shifted to the operating state.

The level of the voltage Von1 is gradually decreased by the AC coupling capacitor C1 being charged. When the level of the voltage Von1 is smaller than a threshold, the switching element U1 is turned off. Here, in the event that the voltage Von1 smaller than the threshold continuously being applied to the switching element U1, power consumption occurs at the switching element U1, and load is applied to the switching element U1. Therefore, it is desirable to provide a later-described high-speed lowering unit 20 to the power-up unit 16.

The high-speed lowering unit 20 is configured so as to include an NPN-type transistor Q1, a capacitor C2, a resistor R2, a zener diode D6, and a resistor R3, for example. A differentiating circuit is formed by the capacitor C2 and resistor R2 to be connected to the collector side of the switching element U1. The level of the output from the differentiating circuit is restricted to be constant by the zener diode D6. The gate of the transistor Q1 is connected to the resistor R3.

When the switching element U1 is turned off, the collector voltage of the switching element U1 is raised. The leading edge of the collector voltage is differentiated by the differentiating circuit made up of the capacitor C2 and resistor R2. The differentiated voltage is supplied to the gate of the transistor Q1 via the resistor R3, and the transistor Q1 is turned on. Current flows into between the collector and emitter of the transistor Q1, and the voltages of both edges of a resistor R10 (voltage at a connection point between the resistor R10 and the switching element U1) are rapidly lowered by the transistor Q1. Thus, the level of the voltage Von1 is rapidly lowered, and the voltage Von1 becomes generally 0 or 0. The voltage Von1 is rapidly lowered, whereby the consumption power of the switching element U1 can be reduced, and load to be applied to the switching element U1 can be reduced.

Figure 5A:
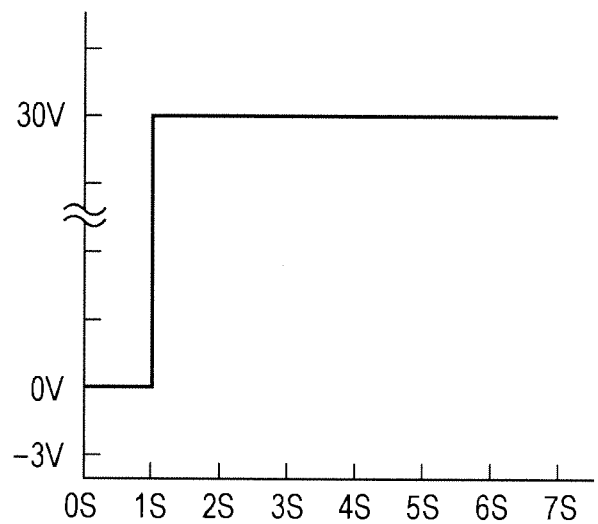
FIGS. 5A and 5B are waveform charts for describing an example of voltage at the power-up unit.

FIG. 5A illustrates an example of the waveform of the voltage V1. The electric storage system is in a shutdown state during 0 through 1 second of elapsed time, and the switch SW1 is on. After one second, activation of the electric storage system is instructed, and accordingly, the switch SW1 is turned off. The switch SW1 is turned off, and accordingly, the voltage V1 (e.g., 30 V) is formed from the voltage of the battery unit BT by the resistor R11 and zener diode D2.

Figure 5B:
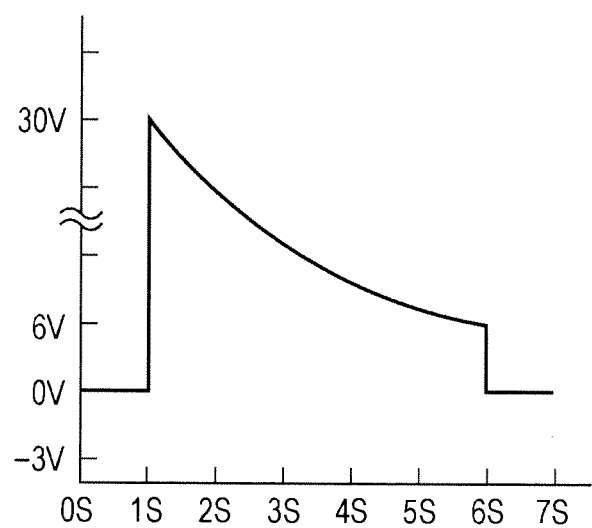

FIG. 5B illustrates an example of the waveform of the voltage Von1 formed from the voltage V1 by the AC coupling capacitor C1. After one second of elapsed time, the voltage V1 is generated. The level of the voltage V1 is tapered by the AC coupling capacitor C1, and the voltage Von1 is formed. The switching element U1 is turned on by the voltage Von1.

After a predetermined period of time, e.g., five seconds after the SW1 is turned off, the level of the voltage Von1 is lowered as compared to the threshold. The level of the voltage Von1 is lowered as compared to 6 V that is an example of the threshold. The level of the voltage Von1 is lowered as compared to the threshold, and accordingly, the switching element U1 is turned off. The switching element U1 is turned off, and accordingly, the high speed lowering unit 20 is activated, the level of the voltage Von1 is rapidly lowered, and becomes generally 0 or 0. Note that the predetermined period of time can suitably be set by changing a time constant as appropriate. Though the details will be described later, the predetermined period of time is suitably set so that after the electric storage system is activated, the switching element 15b can be turned on within the predetermined period of time.

Activating Operation of Electric Storage System

Figure 6:
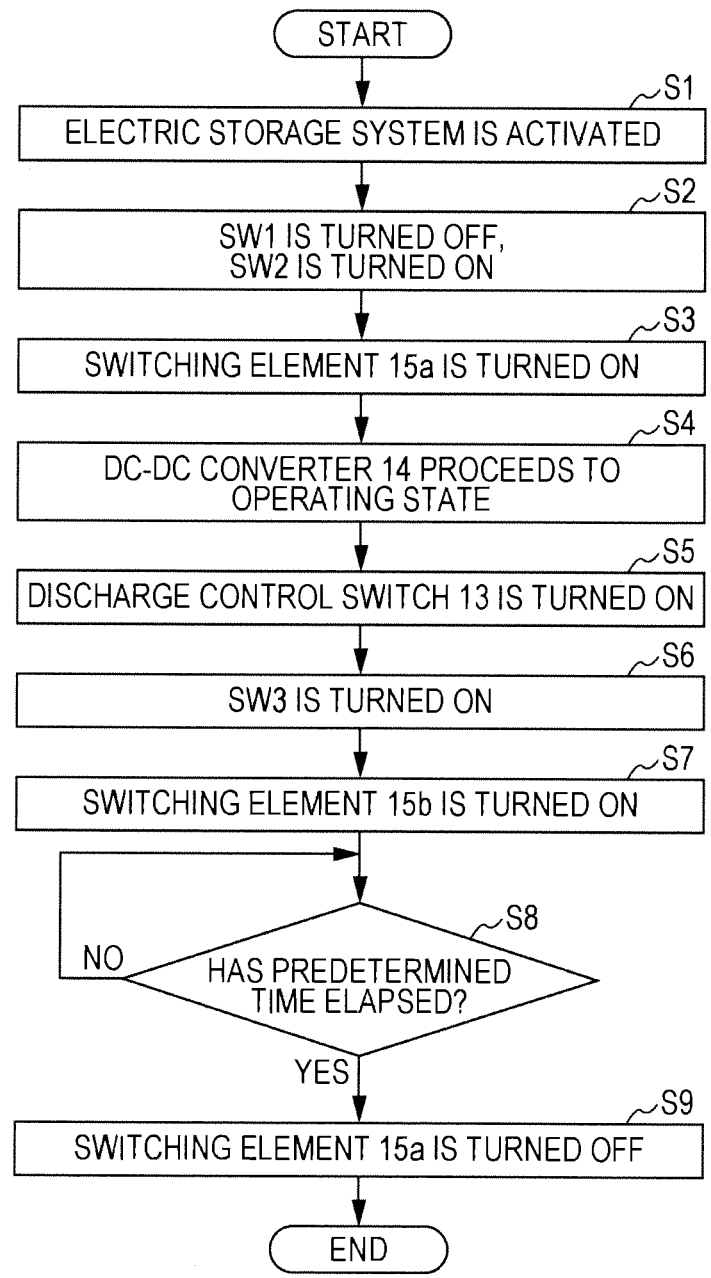
FIG. 6 is a flowchart illustrating an example of processing at the time of activating the electric storage system.

An example of the activating operation of the electric storage system will be described with reference to the flowchart in FIG. 6. In a state in which the power source of the electric storage system is off, for example, the switch SW1 is on, the switch SW2 is off, and the switch SW3 is off. Further, the charging control switch 12a and discharging control switch 13a are off, for example.

In step S1, the power of the electric system is turned on, the electric storage system is activated. In order to turn on the power of the electric storage system, this can be done by an operating unit such as a switch or the like being operated by a user. The power of the electric storage system may automatically be turned on regardless of the user's operations. Upon the power of the electric storage system being turned on, the processing proceeds to step S2.

In step S2, in response to the operation for turning on the power of the electric storage system, the switch SW1 is turned off. The switch SW2 is turned on interlocked with off of the switch SW1. The processing then proceeds to step S3.

In step S3, the switching element 15a is turned on. Specifically, upon the switch SW1 being turned off, voltage V1 is formed of which the pressure has been lowered from the voltage of the battery unit BT by the resistor R11 and zener diode D2. The voltage V1 is AC-coupled by the AC coupling capacitor 21, and accordingly, voltage Von1 that is an example of the first control signal is generated. The voltage Von1 is applied to the gate of the switching element 15a (switching element U1), and the switching element 15a is turned on. The processing then proceeds to step S4.

In step S4, the switching element 15a is turned on, and accordingly, voltage is generated on the primary side of the DC-DC converter 14, and the DC-DC converter 14 is shifted to the operating state. The voltage generated on the primary side of the DC-DC converter 14 is supplied to the secondary side, and the supplied voltage is supplied to the control unit 11 as power supply voltage. The control unit 11 is activated by the supplied power supply voltage. The processing then proceeds to step S5.

In step S5, the discharging control switch 13 is turned on by the control unit 11. Upon the discharging control switch 13 being turned on, the voltage of the battery unit BT is generated between a connection point between the discharging control switch 13 and the terminal T1, and the negative power supply line L2. Voltage Von2 that is and example of a second control signal is formed from the voltage of the battery unit BT by the zener diode 17. The voltage Von2 is generated at a connection point between the zener diode 17 and the resistor 18. The processing then proceeds to step S6.

In step S6, the switch SW3 is turned on by the control unit 11. Upon the switch SW3 being turned on, the voltage Von2 is supplied to the gate of the switching element 15b via the switch SW3 and switch SW2. The voltage Von2 is 15 V, for example. The processing then proceeds to step S7.

In step S7, upon the voltage Von2 being supplied to the gate, the switching element 15b is turned on. Upon the switching element 15b being turned on, the voltage of the battery unit BT is supplied to the DC-DC converter 14 even when the switching element 15a is off. That is to say, the voltage Von2 is supplied to the switching element 15b, and the switching element 15b is turned on, and accordingly, the operating state of the DC-DC converter 14 is held. The processing then proceeds to step S8.

In step S8, determination is made regarding whether or not the predetermined period of time has elapsed. In the event that the predetermined period of time has not elapsed, the processing returns to step S8, and the processing in step S8 is repeated. In the event that the predetermined period of time has elapsed, the processing proceeds to step S9.

In step S9, the switching element 15a is turned off. Upon the predetermined period of time having elapsed, the level of the voltage Von1 to be supplied to the gate of the switching element 15a is lowered as compared to the threshold, and the switching element 15a is turned off. Even when the switching element 15a is turned off, the switching element 15b is on, and accordingly, the operating state of the DC-DC converter 14 is held.

Note that, in step S8, after the predetermined period of time elapses, the switch SW1 may be turned on, for example, by the control of the control unit 11. Upon the switch SW1 being turned on, the zener diode D2 in the power-up unit 16 shorts, and the voltage V1 becomes 0. Therefore, in step S8 and thereafter, the power of the battery unit BT can be prevented from being consumed by the power-up unit 16.

Stop Operation of Electric Storage System

Figure 7:
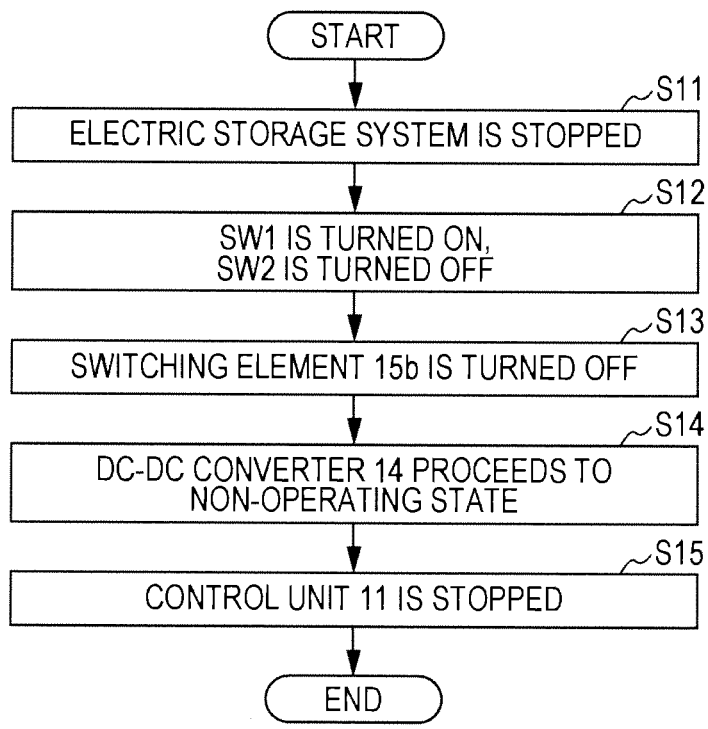
FIG. 7 is a flowchart illustrating an example of processing at the time of stopping the electric storage system.

Next, the stop operation of the electric storage system will be described with reference to the flowchart in FIG. 7. In step S11, the power of the electric storage system is turned off, and the electric storage system is stopped. In order to turn off the power of the electric storage system, the can be done, for example, by the operating unit such as a switch or the like being operated by the user. The power of the electric storage system may automatically be turned off regardless of the user's operations. Upon the power of the electric storage system being turned off, the processing proceeds to step S12.

In step S12, the electric storage system has been turned off, and accordingly, the switch SW1 is turned on. Interlocked with the switch SW1 being turned on, the switch SW2 is turned off. Note that, in the event that the switch SW1 has already been turned on in step S12, the switch SW2 alone is turned off. The processing proceeds to step S13.

In step S13, the switching element 15b is turned off. Specifically, the switch SW2 has been turned off in step S12, and accordingly, supply of the voltage Von2 to the switching element 15b is stopped, and the switching element 15b is turned off. Here, as described above, the switching element 15a has been turned off after elapsed predetermined period of time since the electric storage system was activated. Accordingly, the switching element 15a and switching element 15b are in an off state. The processing proceeds to step S14.

In step S14, the DC-DC converter 14 is shifted to the non-operating state by the switching elements 15a and 15b being turned off. The DC-DC converter 14 is shifted to the non-operating state, and accordingly, supply of power supply voltage from the DC-DC converter 14 to the control unit 11 is stopped. The processing then proceeds to step S15.

In step S15, the operation of the control unit 11 is stopped by supply of power supply voltage from the DC-DC converter 14 being stopped. Note that the charging control switch 12, discharging control switch 13, and switch SW13 may be turned off by the control of the control unit 11 before the operation of the control unit 11 is stopped.

As described above, the electric storage system according to the first embodiment can activate the DC-DC converter 14 by the voltage of the battery unit BT included in the electric storage system even when there is no external power source, and activate the control unit 11.

2. Second Embodiment

Next, an electric storage system according to the second embodiment will be described. The electric storage system according to the second embodiment turns on the switching element 15b by voltage of an external power source in the case that the switching element 15a fails to be turned on by the power-up unit 16 due to insufficient remaining capacity of the battery unit BT.

Figure 8:
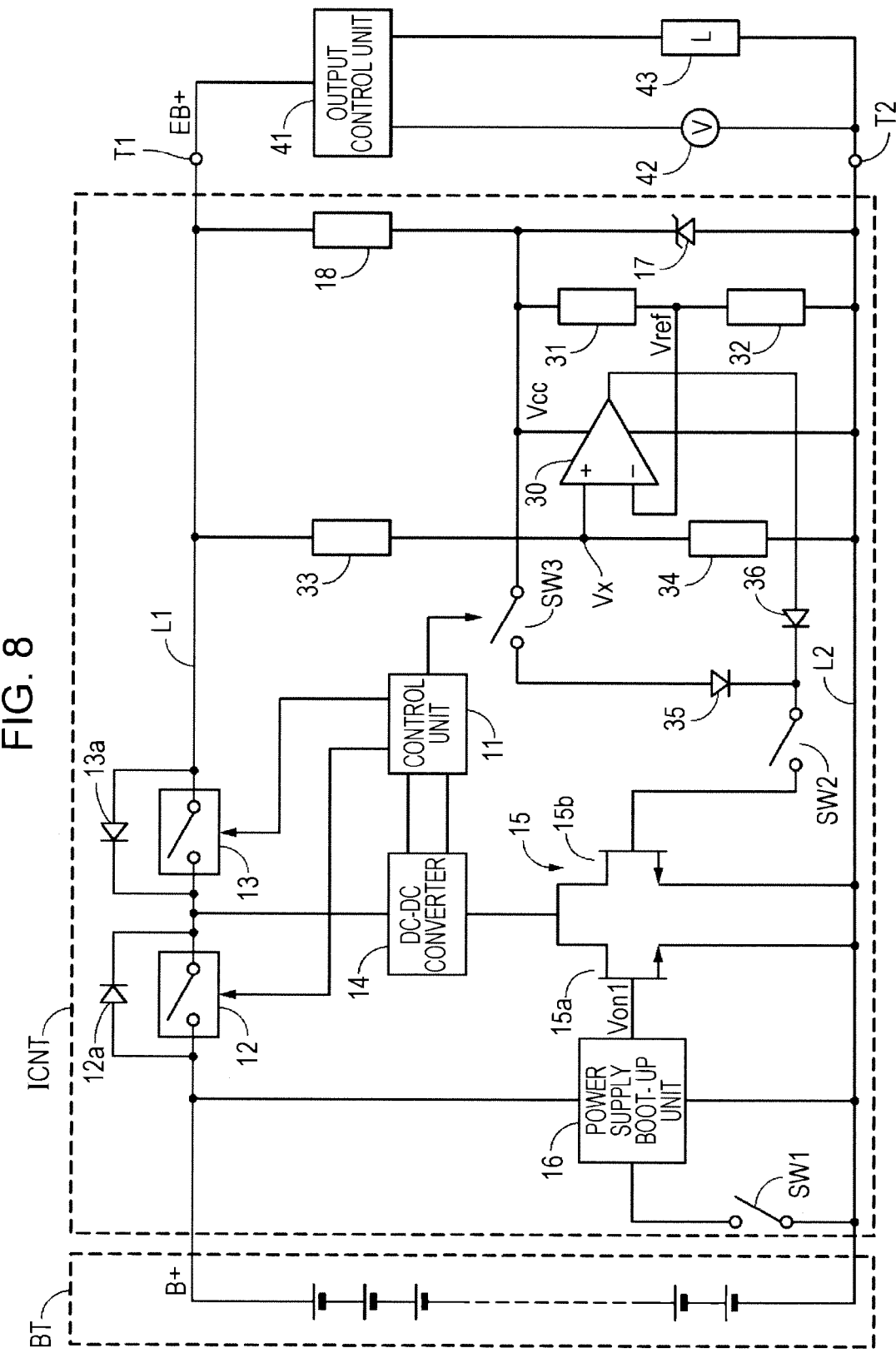
FIG. 8 is a block diagram illustrating another example of the specific configuration of the electric storage system.

FIG. 8 illustrates an example of the configuration of the electric storage system according to the second embodiment. Note that, in FIG. 8, the same components as with the electric storage system according to the first embodiment are denoted with the same reference numerals. With the electric storage system, in the stop state (shutdown state), the switch SW1 is on, and the switch SW2 is off. Also, the charging control switch 12, discharging control switch 13, and switch SW3 are off, for example.

Upon the electric storage system being activated, the switch SW1 is turned off, and also the switch SW2 is turned on. Here, in the event that the remaining capacity of the battery unit BT is small, the voltage Von1 is not formed by the power-up unit 16, and the switching element 15a is not turned on. The switching element 15a is not turned on, and accordingly, the DC-DC converter 14 is not shifted to the operating state. Therefore, a second electric storage system monitors whether or not voltage has been supplied via the terminal T1 and terminal T2, and in the event that voltage has been supplied, shifts the DC-DC converter 14 to the operating state using the voltage thereof.

With the electric storage system, there is provided a comparator 30 for determining whether or not voltage has been applied from the power source 42 to the terminals T1 and T2. a series circuit of a resistor 33 and a variable resistor 34 is inserted between the terminals T1 and T2. The resistance value of the variable resistor 34 is set as appropriate according to the number of connected batteries of the battery unit BT. Voltage Vx generated at a connection point between the resistor 33 and variable resistor 34 is input to the input terminal on the positive side of the comparator 30. Power supply voltage Vcc formed at the zener diode 17 is input to the positive power supply terminal of the comparator 30. The voltage Vcc is 15 V, for example. The negative power supply terminal of the comparator 30 is connected to the power supply line L2. The anode of the zener diode 17 is connected to the power supply line L2, and the cathode of the zener diode 17 is connected to the power supply line L1 via the resistor 18.

Further, the power supply voltage as to the comparator 30 is divided by a resistor 31 and a resistor 32, and accordingly, reference voltage Vref is formed. The reference voltage Vref is supplied to the negative input terminal of the comparator 30. The comparator 30 generates high-level comparison output that is an example of the second control signal in the event that a relation between input voltages is (Vx>Vref), and generates low-level comparison output in other cases. The comparison output is supplied to a diode 36.

An OR circuit is formed by a diode 35 and the diode 36, and upon a high-level signal being input to any one of the diode 35 and diode 36, the high-level signal is supplied to the switch SW2. At the time of activation of the electric storage system, the switch SW3 is off, and accordingly, in reality, determination is made regarding whether or not the high-level signal has been supplied to the diode 36. The high-level signal supplied from the comparator 30 is supplied to the switch SW2 via the diode 36. The switch SW2 has been turned on at the time of activation, and accordingly, the high-level signal is supplied to the switching element 15b via the switch SW2. The switching element 15b is turned on by the supplied high-level signal.

Voltage is generated on the primary side of the DC-DC converter 14 by the switching element 15b being turned on, and the DC-DC converter 14 is shifted to the operating state. The voltage generated on the primary side of the DC-DC converter 14 is supplied to the secondary side of the DC-DC converter 14. The control unit 11 is activated according to the supplied power supply voltage. With the control unit 11, the charging control switch 12 is turned on, for example. The charging control switch 12 has been turned on, whereby the battery unit BT can be charged by the voltage from the power source 42.

In this way, even in the event that the remaining capacity of the battery unit BT is small, the switching element 15b can be turned on using voltage externally supplied via the terminal T1 and terminal, and the DC-DC converter 14 can be shifted to the operating state.

3. Modification

Though description has been made so far regarding the multiple embodiments of the present disclosure, the present disclosure is not restricted to the above embodiments, various modifications can be made. The types of circuit elements in the above embodiments and so forth, the properties of the resistance values and so forth of the circuit elements, and the layout of the circuit elements are examples, and these can be changed as appropriate without departing the scope of the present disclosure.

The sequences of the above processes in the present disclosure can be changed as appropriate within a range in which no technical discrepancy is caused. For example, in FIG. 6, the sequence of the processes in steps S5 and S6 may be reverse, or the processes may be arranged to be performed in parallel.

Figure 9:
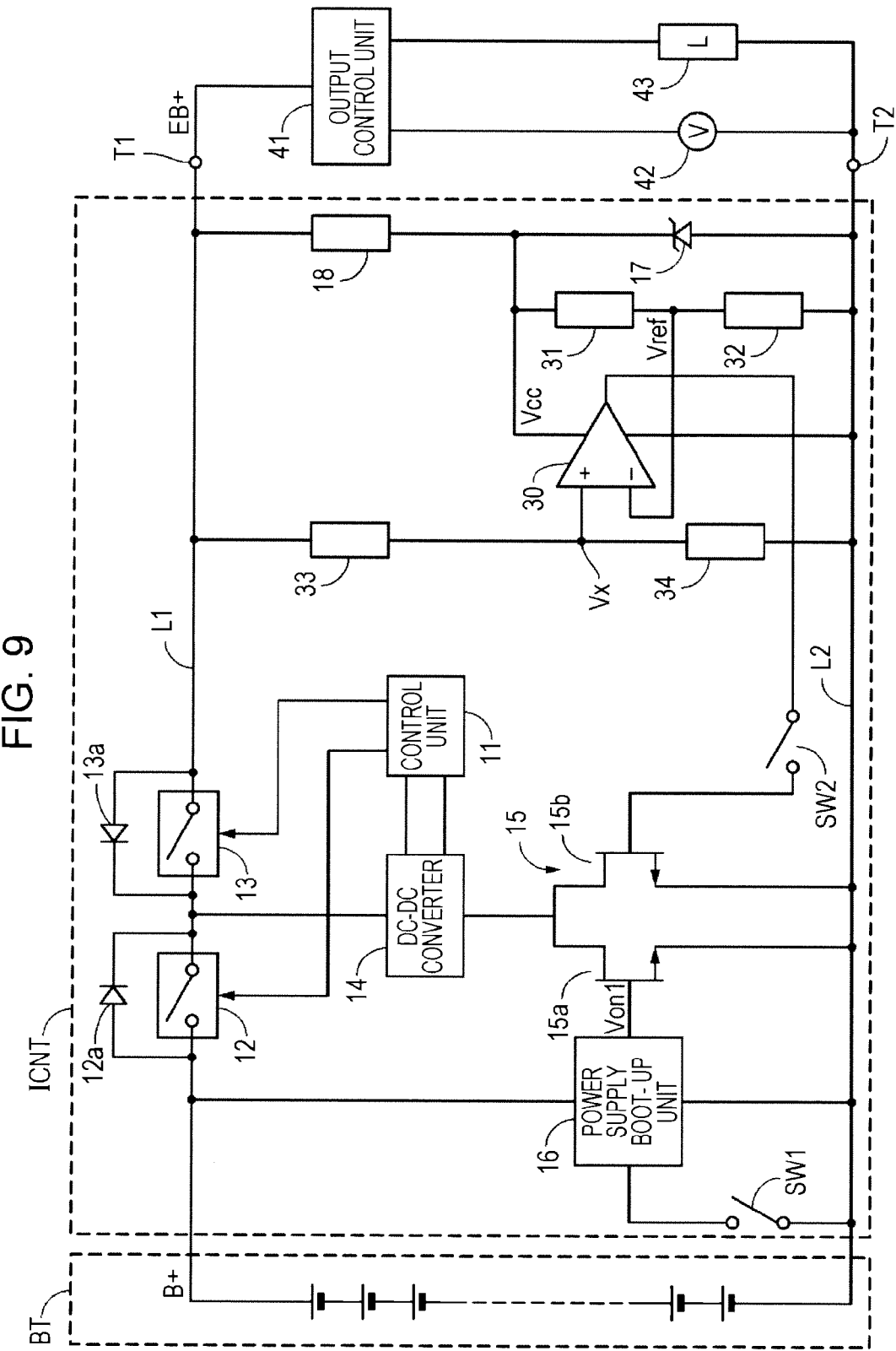
FIG. 9 is a block diagram illustrating an example of the configuration of an electric storage system according to a modification.

The electric storage system described in the second embodiment may have the configuration illustrated in FIG. 9. Specifically, the circuit of the switch SW3 and diode 35 serially being connected, and the diode 36 may be omitted. With the configuration illustrated in FIG. 9, the switching element 15$b$ can be turned on by supplying the high-level comparison output from the comparator 30 to the switching element 15$b$ via the switch SW2.

With the above embodiments, though an example has been described wherein the present disclosure has been applied to an electric storage system, the present disclosure can also be applied to an electric storage module for example. An arrangement may be made wherein the battery unit BT is taken as a battery block within an electric storage module, and the output controller ICNT is taken as a controller CNT in an electric storage module.

Note that the configurations and processes in the above embodiments and modification can be combined as appropriate within a scope without technical discrepancy.

4. Application

An application of the electric storage systems will be described below. Note that applications of the electric storage systems are not restricted to an application described below.

Electric Storage System in House Serving as Application

Figure 10:
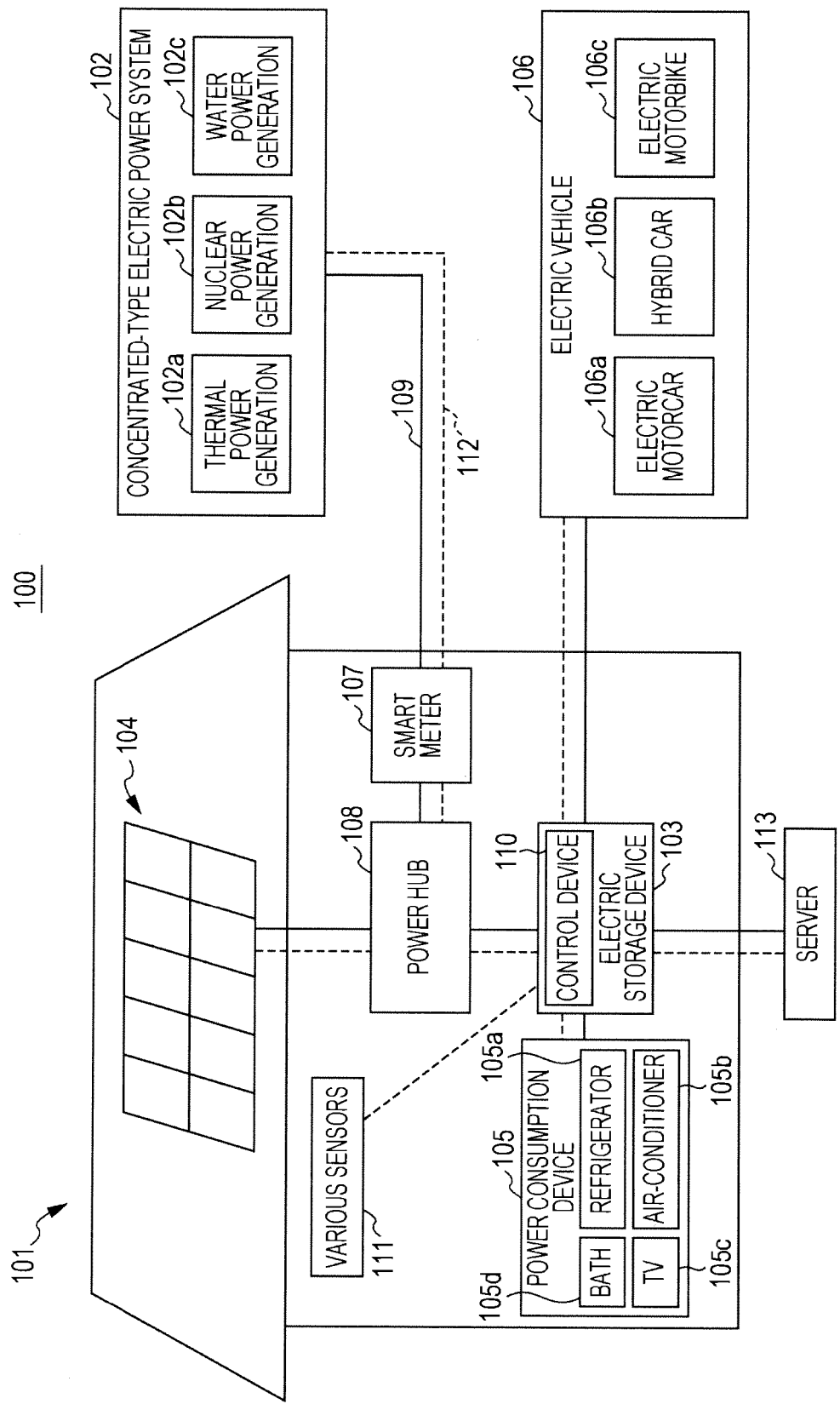
FIG. 10 is a block diagram for describing an application of the electric storage system according to the present disclosure.

Description will be made regarding an example wherein the present disclosure has been applied to a residential electric storage system, with reference to FIG. 10. For example, with an electric storage system 100 for a residence 101, electric power is supplied from a concentrated-type electric power system 102 such as thermal power generation 102$a$, nuclear power generation 102$b$, hydraulic power generation 102$c$, or the like to an electric storage apparatus 103 via an electric power network 109, an information network 112, a smart meter 107, a power hub 108, or the like. In addition to this, electric power is supplied from an independent power source such as a domestic power generating apparatus 104 or the like to the electric storage apparatus 103. The electric power supplied from the electric storage apparatus 103 is accumulated. Electric power to be used at the residence 101 is fed using the electric storage apparatus 103. The same electric storage system can also be used not only for the residence 101 but also for buildings.

At the residence 101, there are provided a power generating apparatus 104, power consumption devices 105, an electric storage apparatus 103, a control device 110 for controlling the devices, a smart meter 107, and sensors 111 for obtaining various types of information. The devices are connected by an electric power network 109 and an information network 112. Solar batteries, fuel cells, windmills, or the like are used as the power generating apparatus 104, and generated electric power is supplied to the power consumption device 105 and/or electric storage apparatus 103. The power consumption device 105 is a refrigerator 105$a$, an air-conditioner 105$b$, a television receiver 105$c$, a bath 105$d$, or the like. Further, an electric vehicle 106 is included in the power consumption device 105. The electric vehicle 106 is an electric motorcar 106$a$, a hybrid car 106$b$, or an electric motorbike 106$c$. The electric vehicle 106 maybe an electrically assisted bicycle, or the like.

The electric storage apparatus 103 is configured of secondary batteries or capacitors. For example, the electric storage apparatus 103 is configured of lithium-ion second batteries. The lithium-ion second batteries may be a fixed type or may be used for the electric vehicle 106. The above electric storage systems according to the present disclosure can be applied to this electric storage apparatus 103. A singular or multiple electric storage systems can be applied thereto. The smart meter 107 has a function for detecting the use amount of commercial power, and transmitting the detected use amount to an electric power company. The electric power network 109 may be any one of or a combination of two or more of DC electric supply, AC electric supply, and non-contact electric supply.

Examples of the various sensors 111 include a human detection sensor, an illuminance sensor, an object detection sensor, a power consumption sensor, a sway sensor, a contact sensor, a temperature sensor, and an infrared sensor. The information obtained by the various sensors 111 is transmitted to the control device 110. According to the information from the sensors 111, the state of the weather, a people's condition, and so forth are recognized, and accordingly, energy consumption can be minimized by automatically controlling the power consumption device 105. Further, the control device 110 can transmit information relating to the residence 101 to an external electric power company or the like via the Internet.

Processing such as branching of the power line, DC-AC conversion, or the like is performed by the power hub 108. As for a communication method of the information network 112 to be connected to the control device 110, there are a method using a communication interface such as UART (Universal Asynchronous Receiver-Transceiver: asynchronous serial communication transmission/reception circuit) or the like, and a method using a sensor network according to the wireless communication standard such as BLUETOOTH™, ZIGBEE™, WI-FI™, or the like. The BLUETOOTH™ method is applied to multimedia communication, and one-to-many connection communication can be performed. ZIGBEE™ uses IEEE (Institute of Electrical and Electronics Engineers) 802.15.4 physical layer. IEEE802.15.4 is a name of short distance wireless network standard called PAN (Personal Area Network) or W (Wireless) PAN.

The control device 110 is connected to an external server 113. This server 113 may be managed by any of the residence 101, an electric power company, and a service provider. Information that the server 113 transmits/receives is, for example, consumption power information, life pattern information, power charges, weather information, natural disaster information, or information relating to power transactions. These information may be transmitted/received from a power consumption device within the home (e.g., television receiver), or may be transmitted/received from a power consumption device outside the home (e.g., cellular phone). These information may be displayed on a device having a display function, e.g., a television receiver, a cellular phone, a PDA (Personal Digital Assistants), or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The control device 110 which controls the units is configured of a CPU, RAM, ROM, and so forth. With this example, the control device 110 is housed in the electric storage apparatus 103. The control device 110 is connected to the electric storage apparatus 103, domestic power generating apparatus 104, power consumption device 105, various sensors 111, and server 113 by the information network 112, and has a function for adjusting, for example, the use amount of commercial power, and production of electricity. Note that, in addition to this, the control device 110 may have a function for performing power transactions at an electricity market, or the like.

As described above, not only the concentrated-type electric power system 102 such as the thermal power 102a, nuclear power 102b, hydraulic power 102c, and so forth but also the generated power of the domestic power generating apparatus 104 (solar power generating, wind power generating) can be accumulated in the electric storage apparatus 103. Accordingly, even though the generated power of the domestic power generating apparatus 104 fluctuates, control can be performed such as stabilizing of power amount to be externally transmitted, or discharging as suitable. For example, usage is also available such that the electric power obtained by solar power generation is accumulated in the electric storage apparatus 103, and also midnight power with reasonable nightly rates is accumulated in the electric storage apparatus 103, and the electric power accumulated by the electric storage apparatus 103 is discharged and used at a time zone of daytime with high rates.

Note that, with this example, though description has been made regarding an example wherein the control device 110 is housed in the electric storage apparatus 103, the control device 110 may be housed in the smart meter 107 or may be configured in a standalone manner. Further, the electric storage system 100 may be used with multiple homes in a residential condominium as an object, or may be used with multiple detached houses as an object.

Electric Storage System in Vehicle Serving as Application

Figure 11:
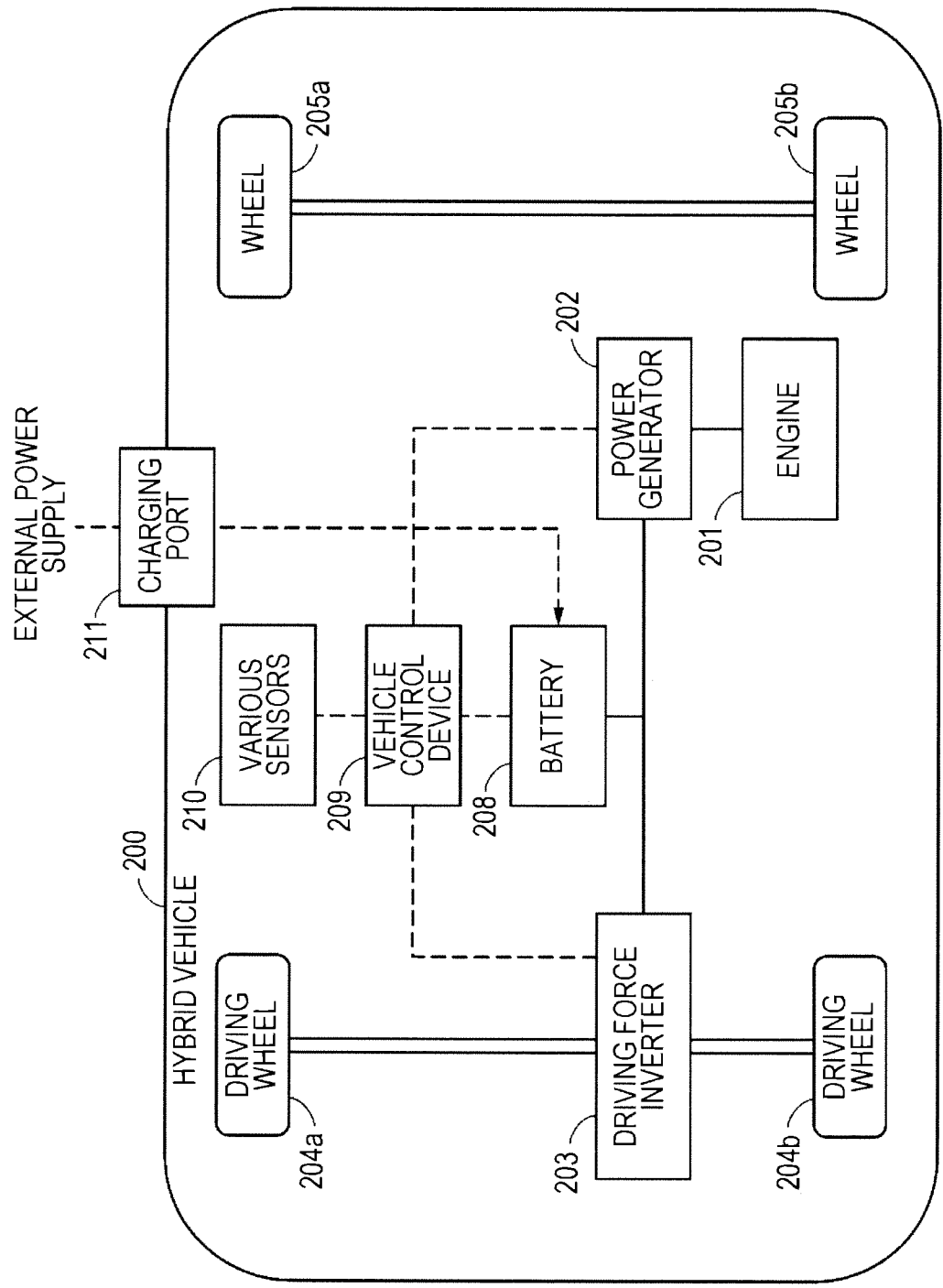
FIG. 11 is a block diagram for describing another application of the electric storage system according to the present disclosure.

Description will be made regarding an example wherein the present disclosure has been applied to an electric storage system for vehicle, with reference to FIG. 11. FIG. 11 schematically illustrates an example of the configuration of a hybrid vehicle employing a series hybrid system to which the present disclosure has been applied. The series hybrid system is a vehicle which drives with a power driving force inverter by using electric power generated at a power generator which is operated by an engine, or the electric power thereof temporarily pulled in a battery.

There are mounted on this hybrid vehicle 200 an engine 201, a power generator 202, a power driving force inverter 203, a driving wheel 204a, a driving wheel 204b, a wheel 205a, a wheel 205b, a battery 208, a vehicle control device 209, various sensors 210, and a charging port 211. The above electric storage system according to the present disclosure is applied to the battery 208. A singular or multiple electric storage systems can be applied thereto.

The hybrid vehicle 200 drives with the power driving force inverter 203 as a driving source. An example of the power driving force inverter 203 is a motor. The power driving force inverter 203 is activated by the electric power of the battery 208, and the torque of this power driving force inverter 203 is propagated to the driving wheels 204a and 204b. Note that direct current to alternate current (DC-AC) or inverse transform (AC-DC conversion) is employed where appropriate, whereby the power driving force inverter 203 can be applied to either a AC motor or a DC motor. The various sensors 210 control the number of revolutions of the engine via the vehicle control device 209, or control the opening of an unshown throttle valve (throttle opening angle). The various sensors 210 include a velocity sensor, an acceleration sensor, a number-of-revolutions-of-engine sensor, and so forth.

The torque of the engine 201 is propagated to the power generator 202, and the electric power generated at the power generator 202 can be accumulated in the battery 208 by this torque.

In the event that the hybrid vehicle has been decelerated by an unshown brake mechanism, the resistance force at the time of deceleration thereof is applied to the power driving force inverter 203 as torque, and the regenerative power generated at the power driving force inverter 203 is accumulated in the battery 208 by this torque.

The battery 208 is connected to an external power source of the hybrid vehicle, whereby the battery 208 can receive power supply from the external power source thereof with the charging port 211 as an input port, and accumulate the received electric power.

Though not illustrated in the drawing, there may be provided an information processing device which performs information processing relating to vehicle control based on information relating to secondary batteries. Examples of such an information processing device include an information processing device which performs battery remaining capacity display based on information relating to battery remaining capacity.

Note that description has been made so far regarding the series hybrid vehicle which uses electric power generated at the power generator which operates the engine, or the electric power thereof being temporally pulled in the battery, and drives with the motor, as an example. However, the present disclosure can effectively be applied to a parallel hybrid vehicle which takes both engine output and motor output as driving sources, and switches and uses three methods of driving by the engine alone, driving by the motor alone, and driving by the engine and motor as appropriate. Further, the present disclosure can effectively be applied to an electric motorcar which drives by driving according to the driving force alone without using the engine.

Note that the present disclosure can also have the following configurations.

In one embodiment, a battery system includes a battery unit including a plurality of battery cells, and a control device including a power supply boot-up unit. The power supply boot-up unit is configured to receive a voltage from the plurality of battery cells, and supply a control signal in response to the voltage supplied by the plurality of battery cells.

In an embodiment, the battery system further comprises a positive power supply line and a negative power supply line connecting the battery unit to the control device.

In an embodiment of the battery system, the power supply boot-up unit includes a series circuit connected to the positive power supply line and the negative power supply line.

In an embodiment of the battery system, the power supply boot-up unit is further connected to the negative power supply line through a power supply boot-up unit switch, and the power supply boot-up unit switch is configured to enable or disable a voltage supply from the battery unit to the power supply boot-up unit.

In an embodiment of the battery system, the series circuit includes a resistor and a zener diode.

In an embodiment of the battery system, the power supply boot-up unit further includes an AC coupling capacitor.

In an embodiment of the battery system, the power supply boot-up unit is configured such that a series circuit voltage that is generated at a connection point between the resistor and the zener diode can be supplied through the AC coupling capacitor to generate the control signal supplied from the power supply boot-up unit.

In an embodiment of the battery system, the control signal is supplied to an operation control unit.

In an embodiment of the battery system, the control device further includes an operation control unit.

In an embodiment of the battery system, the control device further includes a control power supply unit, and the operation control unit is configured to shift the state of the control power supply unit between an operating state and a non-operating state In an embodiment of the battery system, the operation control unit includes a first operation control unit switching element and a second operation control unit switching element, and in the operating state at least one of the first operation control unit switching element and the second operation control unit switching element are on, and in the non-operating state both of the first operation control unit switching element and the second operation control unit switching elements are off.

In an embodiment of the battery system, the operation control unit operates based on the control signal output from the power supply boot-up unit as a first control signal that is applied to the first operation control unit switching element, and a second control signal that is applied to the second operation control unit switching element.

In an embodiment of the battery system, the control device further includes a comparator configured to determine whether a power source voltage has been applied from a power source to a terminal of the positive power supply line and a terminal of the negative power supply line.

In an embodiment of the battery system, the control device further includes a comparator series circuit including a resistor and a variable resistor, the comparator series circuit being connected between the terminal of the positive power supply line and the terminal of the negative power supply line. In this embodiment the comparator includes a comparator positive input terminal configured to receive a comparator series circuit voltage generated at a connection point between the resistor and the variable resistor, and a comparator negative input terminal configured to receive a reference voltage that is based on the power source voltage. Moreover, the comparator is configured to output either a high-level comparison output or a low-level comparison output based on a comparison of the reference voltage and the comparator series circuit voltage.

In an embodiment of the battery system, the control device further includes a first switch connected to an operation control unit and a second switch connected to the power source voltage, and an OR circuit is formed by a first diode positioned between the first switch and the second switch, and a second diode positioned between the first switch and an output terminal of the comparator.

In an embodiment of the battery system, the control device further includes a first switch connected between an operation control unit and an output terminal of the comparator.

In another embodiment, a control device includes a power supply boot-up unit configured to receive a voltage from a battery unit including a plurality of battery cells, the voltage being received from the plurality of battery cells, and supply a control signal in response to the voltage supplied by the plurality of battery cells.

In an embodiment, the control device further comprises a positive power supply line and a negative power supply line connecting the battery unit to the control device.

In an embodiment, the power supply boot-up unit includes a series circuit connected to the positive power supply line and the negative power supply line.

In an embodiment of the control device, the power supply boot-up unit is further connected to the negative power supply line through a power supply boot-up unit switch, and the power supply boot-up unit switch is configured to enable or disable a voltage supply from the battery unit to the power supply boot-up unit.

In an embodiment of the control device, the series circuit includes a resistor and a zener diode.

In an embodiment, the power supply boot-up unit further includes an AC coupling capacitor.

In an embodiment of the control device, the power supply boot-up unit is configured such that a series circuit voltage that is generated at a connection point between the resistor and the zener diode can be supplied through the AC coupling capacitor to generate the control signal supplied from the power supply boot-up unit.

In an embodiment of the control device, the control signal is supplied to an operation control unit.

In an embodiment, the control device further includes an operation control unit.

In an embodiment, the control device further includes a control power supply unit, and the operation control unit is configured to shift the state of the control power supply unit between an operating state and a non-operating state In an embodiment of the control device, the operation control unit includes a first operation control unit switching element and a second operation control unit switching element, and in the operating state at least one of the first operation control unit switching element and the second operation control unit switching element are on, and in the non-operating state both of the first operation control unit switching element and the second operation control unit switching elements are off.

In an embodiment of the control device, the operation control unit operates based on the control signal output from the power supply boot-up unit as a first control signal that is applied to the first operation control unit switching element, and a second control signal that is applied to the second operation control unit switching element.

In an embodiment, the control device further includes a comparator configured to determine whether a power source voltage has been applied from a power source to a terminal of the positive power supply line and a terminal of the negative power supply line.

In an embodiment, the control device further includes a comparator series circuit including a resistor and a variable resistor, the comparator series circuit being connected between the terminal of the positive power supply line and the terminal of the negative power supply line. In this embodiment, the comparator includes a comparator positive input terminal configured to receive a comparator series circuit voltage generated at a connection point between the resistor and the variable resistor, and a comparator negative input terminal configured to receive a reference voltage that is based on the power source voltage. Moreover, the comparator is configured to output either a high-level comparison output or a low-level comparison output based on a comparison of the reference voltage and the comparator series circuit voltage.

In an embodiment, the control device further includes a first switch connected to an operation control unit and a second switch connected to the power source voltage, and wherein an OR circuit is formed by a first diode positioned between the first switch and the second switch, and a second diode positioned between the first switch and an output terminal of the comparator.

In an embodiment, the control device further includes a first switch connected between an operation control unit and an output terminal of the comparator.

In another embodiment, a method of activating an electric storage system includes initiating a supply of a voltage from a battery unit including a plurality of battery cells to a power supply boot-up unit, the voltage being supplied by the plurality of battery cells.

In an embodiment, the method of activating the electrical storage system further comprises activating a power supply to the electrical storage system.

In an embodiment, the method of activating the electrical storage system further comprises turning off a power supply boot-up unit switch that is connected between the battery unit and the power supply boot-up unit, and turning on a first switch connected between an operation control unit and a power supply.

In an embodiment, the operation control unit is connected to the power supply boot-up unit, and the operation control unit includes a first operation control unit switching element and a second operation control unit switching element. In this embodiment the method further comprises in response to a first control signal generated by the power supply boot-up unit, turning of the first operation control unit switching element.

In an embodiment, a control power supply unit is connected to the operation control unit, and the method further comprises shifting a operating state of the control power supply unit to an on state in response to a voltage generated on a primary side of the control power supply unit through the operation control unit, shifting the voltage on the primary side of the control power supply unit to a secondary side of the control power supply unit, and activating a control unit based on a supply of voltage from the secondary side of the control power supply unit.

In an embodiment, the method of activating the electrical storage system further comprises turning on a discharge control switch based on a signal from the control unit, thereby generating a second control signal.

In an embodiment, the method of activating the electrical storage system further comprises supplying the second control signal to the second operation control unit switching element, and in response to the second control signal, turning on the second operation control unit switching element and supplying a voltage from the battery unit to the control power supply unit.

In an embodiment, the method of activating the electrical storage system further comprises after a predetermined period of time, turning off the first operation control unit switching element, thereby maintaining an operating state of the operation control unit.

In another embodiment, a method of deactivating an electronic storage system includes stopping a supply of a voltage from a battery unit including a plurality of battery cells to a power supply boot-up unit, the voltage being supplied by the plurality of battery cells.

In an embodiment, the method of deactivating the electrical storage system further comprises stopping a power supply to the electrical storage system.

In an embodiment, the method of deactivating the electrical storage system further comprises turning on a power supply boot-up unit switch that is connected between the battery unit and the power supply boot-up unit, and turning off a first switch connected between an operation control unit and a power supply.

In an embodiment, the operation control unit is connected to the power supply boot-up unit, and the operation control unit includes a first operation control unit switching element and a second operation control unit switching element. In this embodiment, the method of deactivating the electrical storage system further comprises stopping a supply of a second control signal to the second operation control unit switching element.

In an embodiment, a control power supply unit is connected to the operation control unit. In this embodiment, the method further comprises, in response to the stoppage of the supply of the second control signal to the second operation control unit switching element, turning off the second operation control unit switching element and thereby shifting an operating state of the control power supply unit to an off state.

In an embodiment, the method of deactivating the electrical storage system further comprises, in response to shifting the operating state of the control power supply unit to an off state, stopping a supply of the power supply voltage from the control power supply unit to the control unit.

In another embodiment, an electric vehicle includes a battery system including a battery unit including a plurality of battery cells, and a control device including a power supply boot-up unit configured to receive a voltage from the plurality of battery cells, and supply a control signal in response to the voltage supplied by the plurality of battery cells, and a converter configured to receive a supply of electric power from the battery system, and to supply the power to a component of the electric vehicle.

In an embodiment, the electric vehicle further comprises a positive power supply line and a negative power supply line connecting the battery unit to the control device.

In an embodiment of the electric vehicle, the power supply boot-up unit includes a series circuit connected to the positive power supply line and the negative power supply line.

In an embodiment of the electric vehicle, the power supply boot-up unit is further connected to the negative power supply line through a power supply boot-up unit switch, and the power supply boot-up unit switch is configured to enable or disable a voltage supply from the battery unit to the power supply boot-up unit.

In an embodiment of the electric vehicle, the series circuit includes a resistor and a zener diode.

In an embodiment of the electric vehicle, the power supply boot-up unit further includes an AC coupling capacitor.

In an embodiment of the electric vehicle, the power supply boot-up unit is configured such that a series circuit voltage that is generated at a connection point between the resistor and the zener diode can be supplied through the AC coupling capacitor to generate the control signal supplied from the power supply boot-up unit.

In an embodiment of the electric vehicle, the control signal is supplied to an operation control unit.

In an embodiment of the electric vehicle, the control device further includes an operation control unit.

In an embodiment of the electric vehicle, the control device further includes a control power supply unit, and the operation control unit is configured to shift the state of the control power supply unit between an operating state and a non-operating state.

In an embodiment of the electric vehicle, the operation control unit includes a first operation control unit switching element and a second operation control unit switching element, and in the operating state at least one of the first operation control unit switching element and the second operation control unit switching element are on, and in the non-operating state both of the first operation control unit switching element and the second operation control unit switching elements are off.

In an embodiment of the electric vehicle, the operation control unit operates based on the control signal output from the power supply boot-up unit as a first control signal that is applied to the first operation control unit switching element, and a second control signal that is applied to the second operation control unit switching element.

In an embodiment of the electric vehicle, the control device further includes a comparator configured to determine whether a power source voltage has been applied from a power source to a terminal of the positive power supply line and a terminal of the negative power supply line.

In an embodiment of the electric vehicle, the control device further includes a comparator series circuit including a resistor and a variable resistor, the comparator series circuit being connected between the terminal of the positive power supply line and the terminal of the negative power supply line. In this embodiment the comparator includes a comparator positive input terminal configured to receive a comparator series circuit voltage generated at a connection point between the resistor and the variable resistor, and a comparator negative input terminal configured to receive a reference voltage that is based on the power source voltage. Moreover, the comparator is configured to output either a high-level comparison output or a low-level comparison output based on a comparison of the reference voltage and the comparator series circuit voltage.

In an embodiment of the electric vehicle, the control device further includes a first switch connected to an operation control unit and a second switch connected to the power source voltage, and wherein an OR circuit is formed by a first diode positioned between the first switch and the second switch, and a second diode positioned between the first switch and an output terminal of the comparator.

In an embodiment of the electric vehicle, the control device further includes a first switch connected between an operation control unit and an output terminal of the comparator.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A battery system, comprising:
    a battery unit that includes a plurality of battery cells; and
    a control device that includes a power supply boot-up unit and an operation control unit,
    wherein the power supply boot-up unit is configured to:
        receive a voltage from the plurality of battery cells, and
        supply a first control signal in response to the voltage supplied by the plurality of battery cells,
    wherein the first control signal is supplied from the power supply boot-up unit to a first operation control unit switching element of the operation control unit,
    wherein a supply of a second control signal from a voltage divider to a second operation control unit switching element of the operation control unit is controlled based on an output of the operation control unit, and wherein the voltage divider includes a first zener diode and a first resistor.

2. The battery system according to claim 1, further comprising a positive power supply line and a negative power supply line that connects the battery unit to the control device.

3. The battery system according to claim 2, wherein the power supply boot-up unit includes a series circuit connected to the positive power supply line and the negative power supply line.

4. The battery system according to claim 3, wherein the power supply boot-up unit is further connected to the negative power supply line through a power supply boot-up unit switch, and the power supply boot-up unit switch is configured to enable or disable a voltage supply from the battery unit to the power supply boot-up unit.

5. The battery system according to claim 3, wherein the series circuit includes a second resistor and a second zener diode.

6. The battery system according to claim 5, wherein the power supply boot-up unit further includes an AC coupling capacitor.

7. The battery system according to claim 6, wherein the power supply boot-up unit is further configured such that a series circuit voltage generated at a connection point between the second resistor and the second zener diode is supplied through the AC coupling capacitor to generate the one or more control signals supplied from the power supply boot-up unit.

8. The battery system according to claim 2, wherein the control device further includes a comparator configured to determine whether a power source voltage has been applied from a power source to a terminal of the positive power supply line and a terminal of the negative power supply line.

9. The battery system according to claim 8, wherein the control device further includes a comparator series circuit that includes a third resistor and a variable resistor, wherein the comparator series circuit is connected between the terminal of the positive power supply line and the terminal of the negative power supply line,
    wherein the comparator includes:
        a comparator positive input terminal configured to receive a comparator series circuit voltage generated at a connection point between the third resistor and the variable resistor, and
        a comparator negative input terminal configured to receive a reference voltage that is based on the power source voltage, and
    wherein the comparator is configured to output either a high-level comparison output or a low-level comparison output based on a comparison of the reference voltage and the comparator series circuit voltage.

10. The battery system according to claim 9, wherein the control device further includes:
    a first switch connected to the operation control unit and a second switch connected to the power source voltage; and
    an OR circuit that includes a first diode positioned between the first switch and the second switch, and a second diode positioned between the first switch and an output terminal of the comparator.

11. The battery system according to claim 9, wherein the control device further includes a first switch connected between the operation control unit and an output terminal of the comparator.

12. The battery system according to claim 1, wherein the control device further includes a control power supply unit, and the operation control unit is configured to shift the state of the control power supply unit between an operating state and a non-operating state.

13. The battery system according to claim 12, wherein, in the operating state, at least one of the first operation control unit switching element and the second operation control unit switching element are on, and in the non-operating state, both of the first operation control unit switching element and the second operation control unit switching element are off.

14. The battery system according to claim 1, wherein the operation control unit is further configured to operate based on the first control signal that is applied to the first operation control unit switching element, and the second control signal that is applied to the second operation control unit switching element.

15. The battery system according to claim 1, wherein the second control signal is generated at a connection point between the first zener diode and the first resistor.

16. A control device, comprising:
a power supply boot-up unit configured to:
receive a voltage from a battery unit that includes a plurality of battery cells, wherein the voltage is received from the plurality of battery cells; and
supply a control signal in response to the voltage supplied by the plurality of battery cells;
an operation control unit;
a comparator;
a first switch connected to the operation control unit and a second switch connected to a power source voltage; and
an OR circuit that includes a first diode positioned between the first switch and the second switch, and a second diode positioned between the first switch and an output terminal of the comparator.

17. A method of activating an electronic storage system, the method comprising:
initiating a supply of a voltage from a battery unit that includes a plurality of battery cells to a power supply boot-up unit, wherein the voltage is supplied by the plurality of battery cells; and
supplying a first control signal by the power supply boot-up unit to an operation control unit in response to the voltage supplied by the plurality of battery cells,
wherein the first control signal is supplied from the power supply boot-up unit to a first operation control unit switching element of the operation control unit,
wherein a supply of a second control signal from a voltage divider to a second operation control unit switching element of the operation control unit is controlled based on an output of the operation control unit, and wherein the voltage divider includes a zener diode and a resistor.

18. A method of deactivating an electronic storage system, the method comprising:
stopping a supply of a voltage from a battery unit that includes a plurality of battery cells to a power supply boot-up unit, wherein the voltage is supplied by the plurality of battery cells; and
stopping a supply of one or more control signals,
wherein the one or more control signals are supplied to one or more switching elements of an operation control unit in response to the voltage supplied by the plurality of battery cells,
wherein the supply of one or more control signals is stopped based on a configuration of a first switch connected to the power supply boot-up unit and a second switch connected to the operation control unit,
wherein the configuration of the second switch is based on the configuration of the first switch.

19. An electric vehicle, comprising:
a battery system that includes a battery unit, wherein the battery unit includes a plurality of battery cells; and
a control device that includes a power supply boot-up unit and an operation control unit,
wherein the power supply boot-up unit is configured to:
receive a voltage from the plurality of battery cells, and
supply a first control signal in response to the voltage supplied by the plurality of battery cells,
wherein the first control signal is supplied from the power supply boot-up unit to a first operation control unit switching element of the operation control unit,
wherein a supply of a second control signal from a voltage divider to a second operation control unit switching element of the operation control unit is controlled based on an output of the operation control unit, and wherein the voltage divider includes a zener diode and a resistor; and
a converter configured to receive a supply of electric power from the battery system, and to supply the electric power to a component of the electric vehicle.

* * * * *